United States Patent
Chidate

(10) Patent No.: US 7,964,252 B2
(45) Date of Patent: Jun. 21, 2011

(54) LIQUID CRYSTAL DEVICE, MANUFACTURING METHOD OF LIQUID CRYSTAL DEVICE, AND ELECTRONIC APPARATUS INCLUDING THE LIQUID CRYSTAL DEVICE

(75) Inventor: Kosuke Chidate, Chino (JP)

(73) Assignee: Seiko Epson Corporation, Tokyo (JP)

( * ) Notice: Subject to any disclaimer, the term of this patent is extended or adjusted under 35 U.S.C. 154(b) by 865 days.

(21) Appl. No.: 11/999,636

(22) Filed: Dec. 6, 2007

(65) Prior Publication Data
US 2008/0137011 A1 Jun. 12, 2008

(30) Foreign Application Priority Data

Dec. 6, 2006 (JP) ................... 2006-329080
Oct. 23, 2007 (JP) ................... 2007-275125

(51) Int. Cl.
*C09K 19/54* (2006.01)
*G02F 1/13* (2006.01)

(52) U.S. Cl. ....... 428/1.1; 252/299.5; 349/163; 349/187

(58) Field of Classification Search .................. 428/1.1, 428/1.3; 349/155, 167, 192, 163, 181; 252/299.01, 252/299.5

See application file for complete search history.

(56) References Cited

U.S. PATENT DOCUMENTS

| | | | | |
|---|---|---|---|---|
| 5,253,074 A | * | 10/1993 | Wortel et al. | 348/761 |
| 5,305,126 A | * | 4/1994 | Kobayashi et al. | 349/94 |
| 5,883,687 A | * | 3/1999 | Lu et al. | 349/201 |
| 5,940,155 A | * | 8/1999 | Yang et al. | 349/120 |
| 7,041,348 B2 | * | 5/2006 | Ionescu | 428/1.3 |
| 7,537,811 B2 | | 5/2009 | Inoue et al. | |

FOREIGN PATENT DOCUMENTS

| | | |
|---|---|---|
| JP | 62-112131 A | 5/1987 |
| JP | 08-176549 A | 7/1996 |
| JP | 2005-173439 A | 6/2005 |
| JP | 2007-137986 A | 6/2007 |
| JP | 2007-140018 A | 6/2007 |

OTHER PUBLICATIONS

JPO Website Machine English Translation of jP 08-176549, Naitou et al., Jul. 9, 1996.*
JPO Website Machine English Translation of JP 11-131062, Yoshida et al, May 18, 1999.*

* cited by examiner

*Primary Examiner* — Sophie Hon
(74) *Attorney, Agent, or Firm* — AdvantEdge Law Group, LLC

(57) ABSTRACT

A liquid crystal device includes a pair of substrates and a liquid crystal layer which is interposed between the pair of substrates and which contains at least one kind of additive selected from a ultraviolet ray absorbent and a radical scavenger, in which a gap between the pair of substrates is set according to amount of the additive.

7 Claims, 5 Drawing Sheets

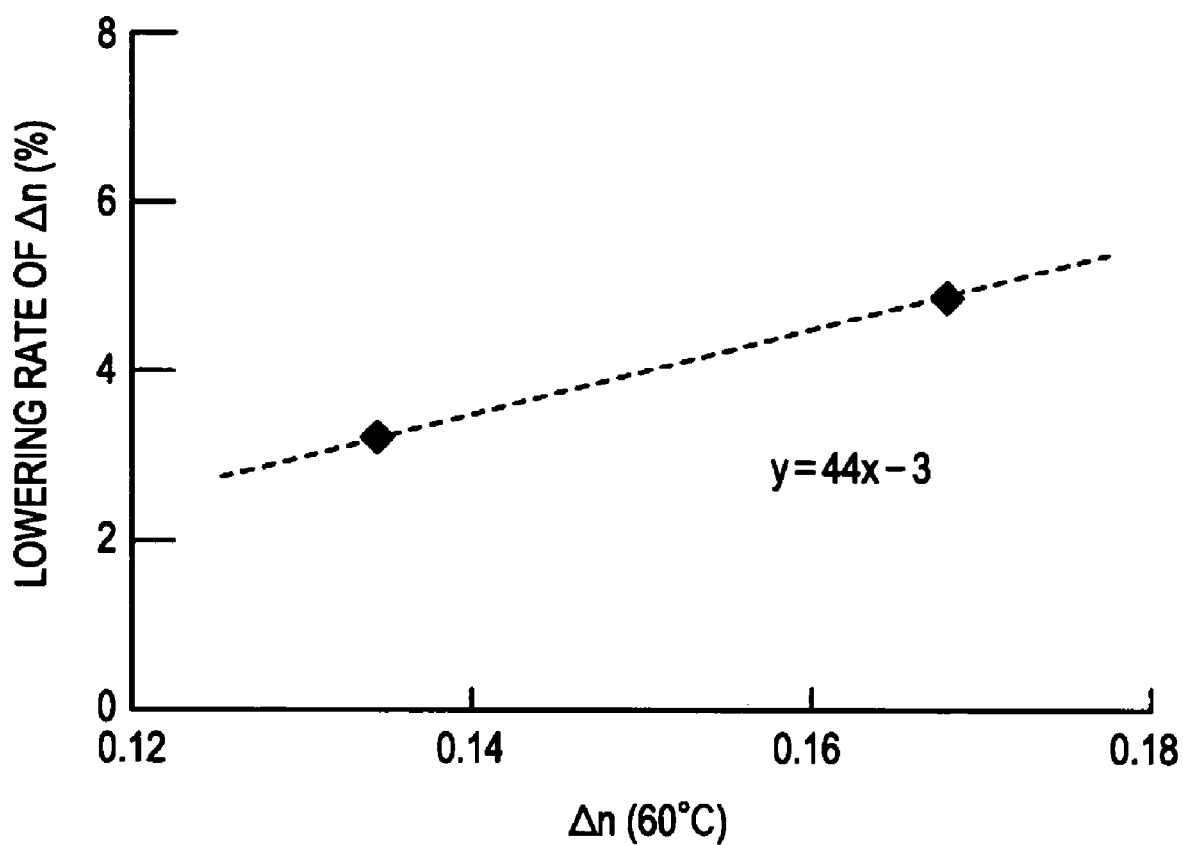

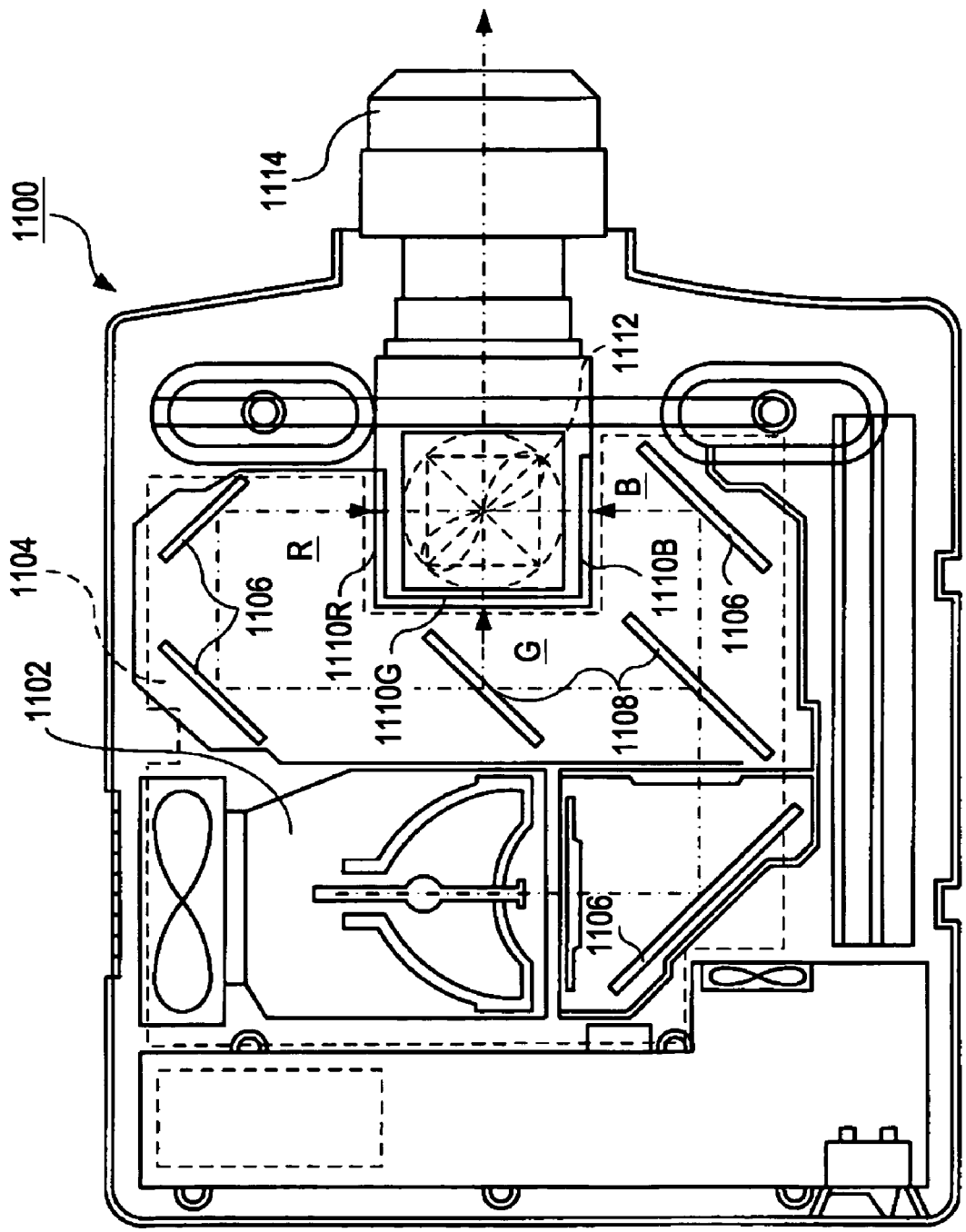

LIQUID CRYSTAL DEVICE, MANUFACTURING METHOD OF LIQUID CRYSTAL DEVICE, AND ELECTRONIC APPARATUS INCLUDING THE LIQUID CRYSTAL DEVICE

BACKGROUND

1. Technical Field

The present invention relates to a liquid crystal device such as a liquid crystal light valve, a manufacturing method of a liquid crystal device, and an electronic apparatus, such as a projector including a liquid crystal device.

2. Related Art

Liquid crystal devices are used, for example, as light valves (light modulating devices) of liquid crystal projectors which is an example of electronic apparatuses. In the light valves, very powerful projection light penetrates through a liquid crystal layer. Accordingly, the projection light having high intensity is used in the light valves due to the general demand for a brighter display image and light resistance of the liquid crystal layer becomes a more important factor. JP-A-8-176549 and JP-A-62-112131 disclose a technique of preventing a liquid crystal material from deteriorating and being isomerized by light or heat by adding an optical stabilizer such as an ultraviolet ray absorbent or antioxidant to the liquid crystal material of a liquid crystal device.

However, the above-mentioned technique just discuss deterioration of liquid crystals by light or heat but does not discuss how the additives such as the optical stabilizer or the antioxidant affect transmittance of a liquid crystal panel. Enhancing light resistance of the liquid crystals enables the projection light having high intensity to be used, and thus it seems that this contributes to accomplishment of a brighter display image. However, there is a technical problem with the technique in that it is practically difficult or impossible to make a display image brighter if transmittance of the liquid crystals which is a very important factor is lowered.

SUMMARY

An advantage of some aspects of the invention is that it provides a liquid crystal device being capable of enhancing light resistance of liquid crystals while maintaining transmittance of a liquid crystal device used in a light valve of a liquid crystal projector, a manufacturing method of the liquid crystal device, and an electronic apparatus including the liquid crystal device.

One aspect of the invention provides a liquid crystal device including a pair of substrates and a liquid crystal layer which is interposed between the pair of substrates and which contains at least one kind of additive selected from a ultraviolet ray absorbent and a radical scavenger, in which a gap between the pair of substrates is set according to amount of the additive.

In the liquid crystal device, the liquid crystal layer is interposed between the pair of substrates. The liquid crystal layer contains at least one kind of additive of the ultraviolet ray absorbent or the radical scavenger. With such a structure, it is possible to enhance the light resistance of the liquid crystals.

In the case in which the additive is added to the liquid crystals, the light resistance of the liquid crystal device is increased in comparison with a structure in which the additive is not used, but it is found that the light transmittance is decreased. In greater detail, the light resistance of the liquid crystal device in which 1 weight % of radical scavenger is added to the liquid crystals as the additive is 1.5 times higher than that of the liquid crystal device in which the additive is not used. On the other hand, the light transmittance of the liquid crystal device in which the additive is not used is 24.2% while the light transmittance of the liquid crystal device in which the additive is used is 23.7%. Here, the term "transmittance" in this application is a value represented in percent figures indicating a ratio of intensity of light passed through out the liquid crystal device to intensity of light which is emitted from a light source and is not passed through out the liquid crystal device, in which the intensity of light is measured by a luminance meter.

According to the research performed by the inventors of the application, it is found that it is possible to adjust the transmittance of the liquid crystal device in which the additive is added to the liquid crystals so as to be set to be equal to that of the liquid crystal device in which the additive is not added to the liquid crystals by adjusting the gap between the substrates (i.e. inter-substrate gap) of the liquid crystal device in which the additive is added. In detail, the inter-substrate gap is set to be large, for example, several tenth micrometers. In greater detail, in the case in which 1 weight % of the radical scavenger is added to the liquid crystals as the additive, if the inter-substrate gap between the substrates is increased by 1 micrometer, it is possible to obtain of 24.1% of the transmittance.

Typically or generally, the gap of the liquid crystal layer is set so as to obtain intended light resistance regardless of the additive, without considering the additive, or in the state in which the additive is not used. In the liquid crystal device, the additive is then added to the liquid crystal layer in order to increase the right resistance. This contributes to the increase of the light resistance, but this also leads to the decrease of the transmittance. That is, the gap is not set regardless of the amount of the additive, but to this end, it is possible to actually increase the light resistance on the sacrifice of the transmittance attributable to addition of the additive.

In the liquid crystal device, the gap between the pair of substrates is set according to the amount of the additive added to the liquid crystal layer. With such a structure, even if the additive is added to the liquid crystal layer, it is possible to maintain the transmittance of the liquid crystal device so as to be substantially equal to that of the liquid crystal device in which the additive is not used. That is, the gap is adjusted so as to be increased to the extent according to the amount of the additive (typically, weight) so that the liquid crystal device in which the additive is added to the liquid crystals has higher transmittance than that of typical liquid crystal devices having the gap which is set so as to obtain the light resistance intended in the case in which the additive is not used. In other words, the gap of the case in which it is assumed that the gap is set regardless of the amount of the additive is adjusted so as to be increased by a degree corresponding to the additive amount according to the amount of the additive.

As a result, according to the invention, it is possible to provide a liquid crystal device which can increase the right resistance without while maintaining the light transmittance.

In the liquid crystal device, it is preferable that the gap d is set to satisfy an expression, $0.427 < (1-0.04A) \times \Delta n \times d < 0.545$, wherein $\Delta n$ is the refractive index anisotropy of the liquid crystal layer and A is the percent per additives by weight.

In the invention, the term "refractive index anisotropy $\Delta n$" means a difference between a refractive index $n(\|)$ in a long-axis direction of a liquid crystal molecule and a vertical refractive index $n(\perp)$, i.e. $\Delta n = n(\|) - n(\perp)$. In this aspect, the light transmittances of all light components irradiated onto the liquid crystal device, including red light having a wavelength of 650 nanometers, green light having a wavelength of 550 nanometers, and blue light having a wavelength of 450 nanometers, can be 90% or more. Such advantages are remarkably effective in the case in which the refractive index anisotropy Δn is about 0.18 and temperature of the liquid crystal layer is around 40° C.

In the liquid crystal device, it is preferable that the gap d is set to satisfy an expression, 0.465<(1−0.04A)×Δn×d<0.479.

With such a structure, it is possible to make the transmittances of light components including the red light, the green light, and the blue light become 95% or more. In particular, the advantage of the invention is remarkably effective in the case in which the refractive index anisotropy Δn is about 0.18 and the temperature of the liquid crystal layer is around 40° C.

In the liquid crystal device, it is preferable that the liquid crystal layer contains twisted nematic (TN) liquid crystals.

With such a structure, it is possible to use liquid crystals having a physical property (for example, refractive index anisotropy) which is difficult to be used in a liquid crystal device employing a reflective type display system.

In the liquid crystal device, it is preferable that the liquid crystal device displays an image by a transmissive type display system.

With such a structure, it is possible to use liquid crystals having a physical property (for example, refractive index anisotropy) which is difficult to be used in a liquid crystal device employing a reflective type display system.

In the liquid crystal device, it is preferable that the gap between the pair of substrates is set according to the reflective index anisotropy in addition to the amount of the additive.

With such a structure, since the gap between the pair of substrates is set according to the amount of the additive contained in the liquid crystal layer and the refractive index anisotropy, it is possible to more properly set the gap, considering the change of the refractive index anisotropy before and after the additive is added.

According to the research performed by the inventors of the application, it is found that lowering of the refractive index anisotropy, which occurs when the additive is added to the liquid crystal layer, depends on the refractive index anisotropy which is set before the additive is added. In detail, as the refractive index anisotropy, before the additive is added, becomes higher, a lowering rate of the refractive index anisotropy when the additive is added becomes larger.

Accordingly, it is possible to precisely detect the lowering rate of the refractive index anisotropy when the additive is added by setting the gap between the pair of substrates according to the amount of the additive contained in the liquid crystal layer and the refractive index anisotropy. Thus, it is possible to maintain the transmittance of the liquid crystal device, in which the additive is added, at the same level as the transmittance of the liquid crystal device, in which the additive is not added.

In the liquid crystal device in which the gap between the pair of substrates is set according to the refractive index anisotropy in addition to the amount of the additive, the gap between the pair of substrates may be set according to temperature of the liquid crystal layer in addition to the amount of the additive and the refractive index anisotropy.

With such a structure, since the gap between the pair of substrates is set according to the temperature of the liquid crystal layer in addition to the amount of the additive and the refractive index anisotropy, it is possible to more properly set the gap to which affection of the change of the temperature of the liquid crystal layer is imparted. Here, the term "temperature of the liquid crystal layer" is typically a temperature when the liquid crystal device operates. For example, the gap between the substrates is set under the assumption that the "temperature of the liquid crystal layer" is 60° C. in a projector in which the liquid crystal device is used as a light valve.

According to the research performed by the inventors of the application, it is found that the lowering rate of the refractive index anisotropy when the additive is added to the liquid crystal layer depends on the temperature of the liquid crystal layer. In detail, as the temperature of the liquid crystal becomes higher, the lowering rate of the refractive index anisotropy when the additive is added becomes higher.

Accordingly, it is possible to precisely detect the lowering rate of the refractive index anisotropy when the additive is added by setting the gap between the pair of substrates according to the temperature of the liquid crystal layer in addition to the amount of the additive and the refractive index anisotropy. Thus, it is possible to maintain the transmittance of the liquid crystal layer in which the additive is used at the same level as that of the liquid crystal device in which the additive is not used.

In the liquid crystal device in which the gap between the pair of substrates is set according to the temperature of the liquid crystal layer in addition to the amount of the additive and the refractive index anisotropy, the gap (d) may be set to satisfy an expression, $0.427 < \{\Delta n - A \times \Delta n \times (k \times \Delta n - 3) \div 100\} \times d < 0.545$, wherein k is the temperature coefficient set on the basis of the temperature of the liquid crystal layer.

With such a structure, the temperature coefficient k is set on the basis of the temperature of the liquid crystal layer. Here, the term "temperature coefficient" is a value representing a slope when the lowering rate of the refractive index anisotropy when the additive is added is calculated on the basis of the refractive index anisotropy when the additive is not added. For example, the lowering rate of the refractive index anisotropy when 1% of the additive is added to the liquid crystal layer is taken as Δn (add), an equation, $\Delta n(add) = 29 \times \Delta n - 3$, is approximately established when the temperature of the liquid crystal layer is about 20° C. Accordingly, for this instance, the temperature coefficient k becomes 29. When the temperature of the liquid crystal layer is about 60° C., an equation, $\Delta n(add) = 44 \times \Delta n - 3$, is established and thus the temperature coefficient k becomes 44 at this time. The temperature coefficient k can be obtained by actually measuring the lowering rte of the refractive index anisotropy when the additive is added by using liquid crystals having different refractive index anisotropies.

If the gap between the substrates is set to satisfy an expression, $0.427 < \{\Delta n - A \times \Delta n \times (k \times \Delta n - 3) \div 100\} \times d < 0.545$, wherein k is the temperature coefficient, transmittances of light components (for example, red light having a wavelength of 650 nanometers, green light having a wavelength of 550 nanometers, and blue light having a wavelength of 450 nanometers) can be 90% or more. That is, it is more securely maintain the transmittance of the liquid crystal device of the invention at the same level as that of the liquid crystal device in which the additive is not added.

In the liquid crystal device in which the gap between the pair of substrates is set according to the temperature of the liquid crystal layer in addition to the amount of the additive and the refractive index anisotropy, the gap d may be set to satisfy an expression, $0.465 < \{\Delta n \times A \times \Delta n \times (k \times \Delta n - 3) \div 100\} \times d < 0.479$.

With such a structure, it is possible to accomplish 95% or more of transmittance with respect to the light which is made incident on the liquid crystal device, i.e. with respect to the red light, the green light, and the blue light. That is, it is possible to maintain the transmittance of the liquid crystal device in which the additive is used at the same level as that of the liquid crystal device in which the additive is not used.

Another aspect of the invention provides a manufacturing method of a liquid crystal device a pair of substrates and a liquid crystal layer which is interposed between the pair of substrates and which contains at least one kind of additive of additives including ultraviolet ray absorbent and radical scavenger. The manufacturing method includes setting a gap between the pair of substrates according to amount of the additive and bonding the pair of substrates with the gap between the pair of substrates to each other.

With such a method, like the liquid crystal device according to the invention, it is possible to provide a liquid crystal device which is capable of enhancing the light resistance while maintaining the transmittance.

A further aspect of the invention provides an electronic apparatus including the liquid crystal device according to some aspects.

With such an electronic apparatus, since the electronic apparatus includes the above-described liquid crystal device, it is possible to enhance the light resistance while maintaining the transmittance. As a result, it is possible to display a high grade image and to realize a variety of kinds of electronic apparatuses, such as a projective type display device, a television, a cellular phone, an electronic organizer, a word processor, a viewfinder type or monitor direct viewing type video recorder, a workstation, a video conferencing phone, a POS terminal, and a touch panel.

Operations and other advantageous effects of the invention may be apparent from the following embodiments.

BRIEF DESCRIPTION OF THE DRAWINGS

The invention will be described with reference to the accompanying drawings, wherein like numbers reference like elements.

FIG. 7 is a graph illustrating the relationship between initial values of the refractive index anisotropy Δn and lowering rates of the refractive index anisotropy Δn when the additive is added to the liquid crystal layer in the case in which the temperature of the liquid crystal layer is about 60° C.

FIG. 8 is a plan view illustrating structure of a projector employing the liquid crystal device.

DESCRIPTION OF EXEMPLARY EMBODIMENTS

Figure 1:
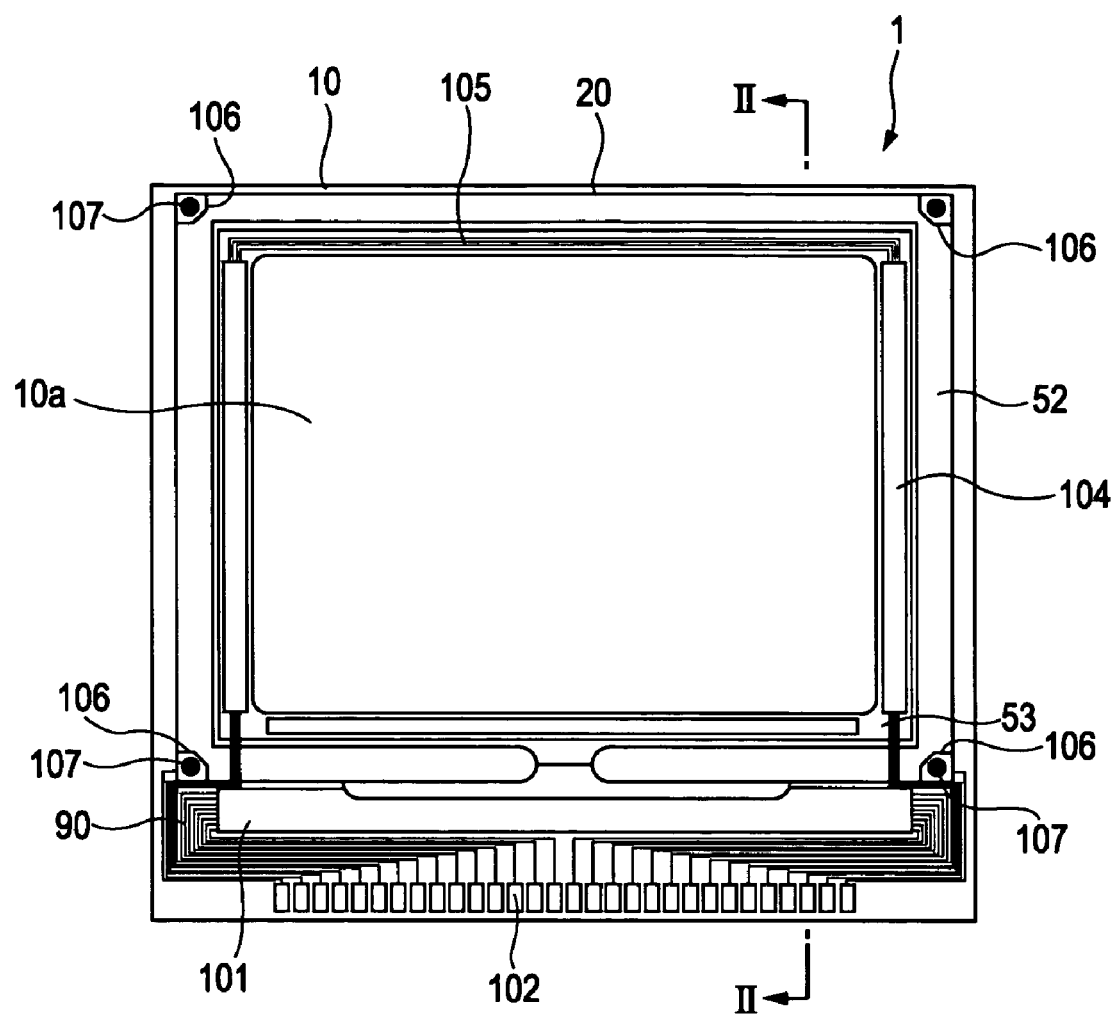
FIG. 1 is a plan view illustrating overall structure of a liquid crystal device.
Figure 2:
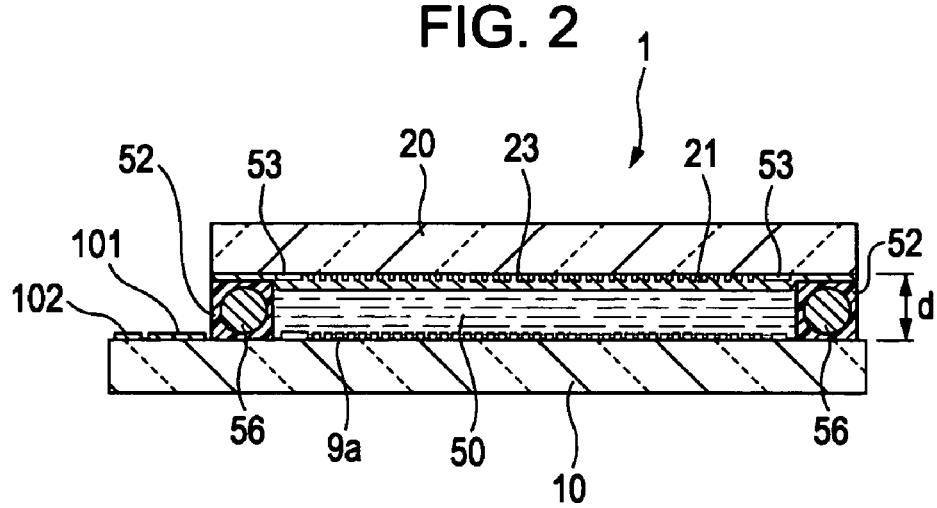
FIG. 2 is a sectional view taken along II-II' shown in FIG. 1.

Hereinafter, embodiments of the invention will be described with reference to the accompanying drawings.
1: Structure of Liquid Crystal Device First, a liquid crystal device according to one embodiment of the invention will be described with reference to FIGS. 1 and 2. The liquid crystal device according to this embodiment is a liquid crystal device used in a light valve of a projection type display device such as a liquid crystal projector. FIG. 1 shows overall structure of the liquid crystal device according to this embodiment, and FIG. 2 is a sectional view taken along line II-II' shown in FIG. 1. Here, a liquid crystal device having a driving circuit embedded thin film transistor (TFT) active matrix driving system is provided as an example of the liquid crystal device of the invention.

In FIGS. 1 and 2, the liquid crystal device 1 includes a TFT array substrate 10 and an opposing substrate 20 facing to each other. The TFT array substrate 10 and the opposing substrate 20 are one example of a "pair of substrates" in the invention. The TFT array substrate 10 is a transparent substrate formed of a quartz substrate, a glass substrate, or a silicon substrate. The opposing substrate 20 is a transparent substrate made of a quartz substrate or a glass substrate. A liquid crystal layer 50 is interposed between the TFT array substrate 10 and the opposing substrate 20. The TFT array substrate 10 and the opposing substrate 20 are bonded to each other by a sealing member 52 disposed at a sealing region located at a perimeter of an image display region 10a.

The liquid crystal layer 50 has a structure containing TN liquid crystals. The liquid crystal layer 50 contains at least one kind of additive of additives such as ultraviolet ray absorbent and radical scavenger, and this leads to enhancement of light resistance of the liquid crystal layer 50.

Both the optical characteristic such as transmittance of the liquid crystal device 1 and the light resistance of the liquid crystal layer are in almost the tradeoff relationship with respect to a physical property of liquid crystals and an inter-substrate gap d between the TFT array substrate 10 and the opposing substrate 20. That is, when improvement of the optical characteristic such as the transmittance is attempted, the light resistance of the liquid crystals tends to be degraded. Accordingly, in this embodiment, both the physical property of the liquid crystals contained in the liquid crystal layer 50 and the size d of the inter-substrate gap are set on the basis of a result of a test performed by the inventors and the condition under which the optical characteristic of the liquid crystal device and the light resistance do not cause a problem from the practical viewpoint. Detailed values of the physical property of the liquid crystals and the gap d between the substrates will be described with reference to the test result which will be described below.

The sealing member 52 is made of ultraviolet ray resin or heat-curable resin in order to bond both the substrates to each other. In the manufacturing process, the ultraviolet ray resin or heat-curable resin is first coated on the TFT array substrate 10, and then is cured by ultraviolet ray irradiation or heating. In the sealing member 52, gap members 56 such as glass fiber or glass beads are distributed in order to set the inter-substrate gap d to a predetermined value.

In FIG. 1, frame-shaped light-blocking films 53 having the light-blocking characteristic, which defines a frame-shaped region of an image display region 10a, are arranged in parallel with each other inside the sealing region provided with the sealing member 52 on the opposing substrate 20. A data line driving circuit 101 and external circuit connection terminals 102 are disposed along one first edge of the TFT array substrate 10 at a region disposed outside the sealing region provided with the sealing member 52, of a perimeter region located at a perimeter of the image display region 10a. A power source and a variety of kinds of signals used for driving the liquid crystal device 1 are supplied to the liquid crystal device 1 via the external circuit connection terminals 102 electrically connected to external circuits. Thanks to such a structure, the liquid crystal device goes undergoes a driving state. The liquid crystal device 1 according to this embodiment employs a transmissive type display system. During operation of the liquid crystal device 1, the upper surface of the opposing substrate 20, which is the upper side in FIG. 2 with respect to the liquid crystal layer 50, is a light incidence surface onto which light entering the liquid crystal device 1 impinges. The lower side in FIG. 2, i.e. the lower surface of the TFT array substrate 10 with respect to the liquid crystal layer 50 is a light exit surface from which light, passed through the liquid crystal device 1, exits.

Scan line driving circuits 104 are disposed inside the sealing region while extending along two second edges adjacent to the first edge so as to be covered with the frame-shaped light-blocking films 53. Further, a plurality of wirings 105 disposed on both sides of the image display region 10a is disposed along a remaining edge of the TFT array substrate 10 so as to be covered with the frame-shaped light-blocking films 53 in order to make an electrical connection between the two scan line driving circuits 104. Vertical conductive terminals 106 are arranged on the TFT array substrate 10 at positions corresponding four corners of the opposing substrate 20 in order to accomplish electrical conduction between the TFT array substrate 10 and the opposing substrate 20 by vertical conductive members 107. It is possible to accomplish electrical conduction between the TFT array substrate 10 and the opposing substrate 20.

Leading wirings 90 are formed on the TFT array substrate 10 in order to make an electrical connection among the external circuit connection terminals 102, the data line driving circuit 101, the scan line driving circuits 104, and the vertical conductive terminals 106.

In FIG. 2, a stacked structure including pixel switching TFTs which are driving elements and wirings such as scan lines and data lines is formed on the TFT array substrate 10. Pixel electrodes 9a are disposed on the pixel switching TFTs and the wirings such as scan lines and data lines in the image display region 10a in a matrix form. An aligning film is formed on the pixel electrodes 9a. A light-blocking film 23 is formed on a surface of the opposing substrate 20, which faces the TFT array substrate 10. An opposing electrode 21 made of a transparent material such as ITO is formed on the light-blocking film 23 so as to face the pixel electrodes 9a in a solid form. An aligning film is formed on the opposing electrode 21.

Even though not shown in this figure, besides the data line driving circuit 101 and the scan line driving circuits 104, a sampling circuit driven by the data line driving circuit 101 so as to sample and supply image signals on the leading wiring 90 to the data lines is formed on the TFT array substrate 10. Further, a test circuit and test patterns used for testing quality and defects of the liquid crystal device during manufacturing procedure and before shipping is also formed on the TFT array substrate 10.

2: Relationship Between a Physical Property and a Gap Between Substrates

Figure 3:
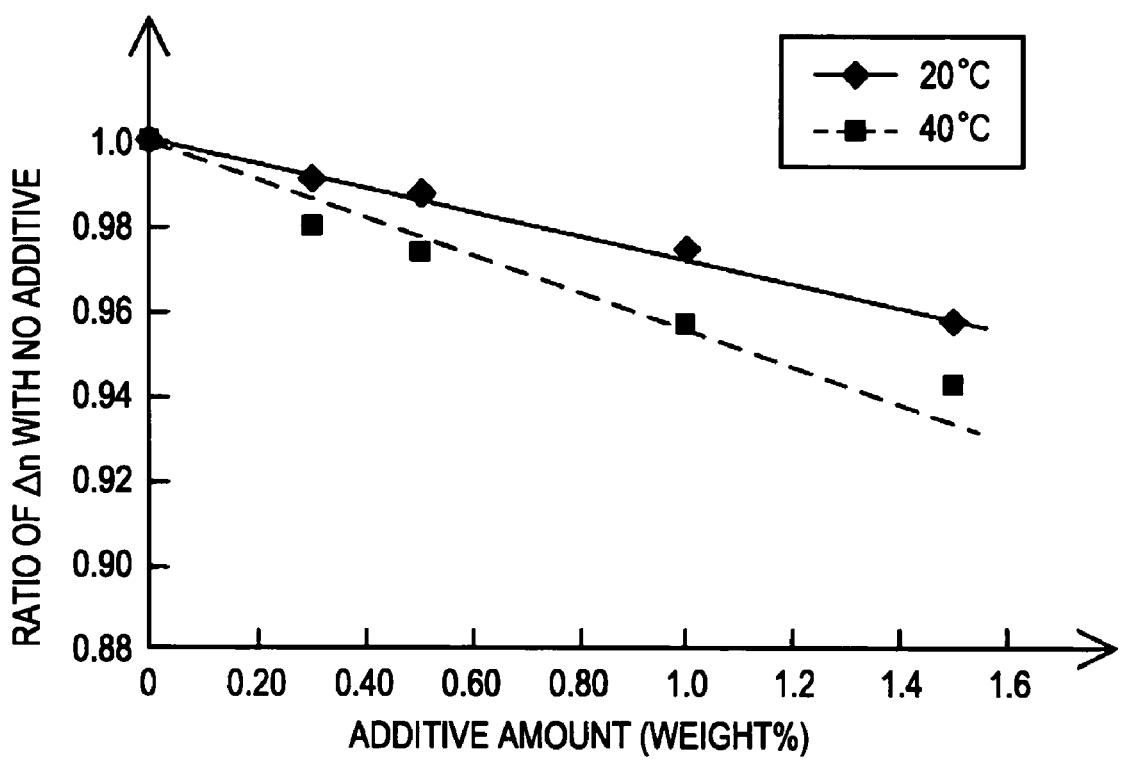
FIG. 3 is a graph illustrating the relationship between amount of an additive added to liquid crystals and a lowering rate of refractive index anisotropy Δn of the liquid crystals.

Next, the relationship between a physical property of the liquid crystals of the liquid crystal layer 50 and a gap d between substrates (referred to as inter-substrate gap d) will be described in detail with reference to FIGS. 3 and 4. FIG. 3 is a graph illustrating a result of a test of observing the change of a lowering rate of the refractive index anisotropy Δn of liquid crystals when an amount (weight %) of an additive added to the liquid crystals varies while the inter-substrate gap d is fixed. In FIG. 3, rhombic and rectangular plots are actual measurement values when the temperatures of the liquid crystals are 20° C. and 40° C., respectively, and a solid line and a dashed line indicate approximate values based on the actual measurement values. An example of the radical scavenger used in this embodiment is a phenol-based compound. Instead of the phenol-based compound, an amine-based compound, a phosphorus-based compound, or a sulfur-based compound can be used. Further, benzophenone or benzotriazole can be used as an example of the ultraviolet ray absorbent.

According to the research performed by the inventors, it is found that the higher the refractive index anisotropy Δn, the higher the transmittance of the liquid crystal device. Accordingly, as shown in FIG. 3, it can be seen that the transmittance is decreased as the amount of the additive added to the liquid crystals is increased. The refractive index anisotropy Δn is calculated from the following expressions, Expression (1) and Expression (2) which are used to obtain the transmittance $I_{out}$.

$$I_{out} = \frac{1}{2}[1-\sin^2\{\pi/2\}\sqrt{(1+u^2)}/(1+u^2)] \qquad \text{Expression 1:}$$

$$u = 2\Delta nd/\lambda \qquad \text{Expression 2:}$$

Here, in Expression 1 and Expression 2, λ is a wavelength of light and d is the inter-substrate gap.

Next, the relationship between the inter-substrate gap d and the transmittance is theoretically discussed with reference to FIG. 4 and Expressions 1 and 2. FIG. 4 is a graph showing the calculation result of the transmittance corresponding to retardation Δn·d in the liquid crystal layer 50, in which a wavelength of light irradiated on the liquid crystal device 1 is used as a parameter in the calculation and the calculation is performed on the basis of Expressions 1 and 2. In FIG. 4, examples of the wavelength of light irradiated on the liquid crystal device 1 include 650 nanometers of red light, 550 nanometers of green light G, and 450 nanometers of blue light B.

Figure 4:
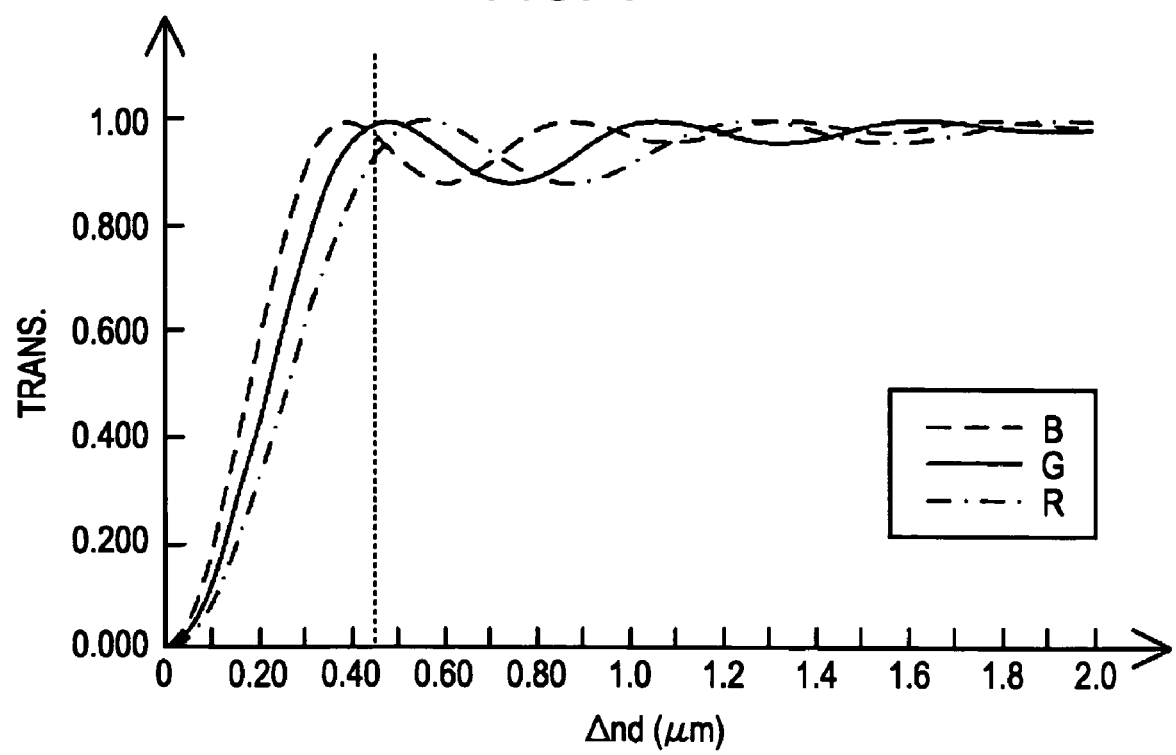
FIG. 4 is a graph illustrating transmittance corresponding to retardation (Δn·d) of a liquid crystal layer, which is calculated by a theoretical formula.

As shown in FIG. 4 and Expressions 1 and 2, the transmittances for all wavelengths depend on the retardation Δn·d. For example, the transmittance of the green light G is the highest (position of the dotted line in FIG. 4) when the retardation Δn·d is 0.45. Accordingly, when designing the liquid crystal layer 50 generally containing TN liquid crystals, it is ideal that the retardation Δn·d of the green light G having higher luminous efficiency with respect to the human eye than the red light R and the blue light B is 0.45.

However, in practical, the liquid crystal layer 50 is designed considering variation of mechanical precision in manufacturing procedure of the liquid crystal device. That is, it is preferable that the liquid crystal layer 50 is designed to satisfy 0.427<Δn·d<0.545, so each of the transmittances of the red light R, the green G, and the blue B is 90% or more. Further, it is more preferable that the liquid crystal layer 50 is designed to satisfy 0.465<Δn·d<0.479, so each of the transmittances of the red ling R, the green light G, and the blue light B is 95% or more.

On the other hand, as shown in FIG. 3, the relationship between the lowering rate of the refractive index anisotropy Δn and the amount of the additive added to the liquid crystals is a linear function. When the refractive index anisotropy after the additive is added to the liquid crystals is taken as Δn' and the weight % of the additive is taken as A, Δn'=(1−0.03A) Δn at 20° C., and Δn'=(1−0.04A) Δn at 40° C.

In the case in which the liquid crystal device 1 is used as a light valve of a projection type display device such as a liquid crystal projector, the liquid crystal device 1 operates at a high temperature. Accordingly, when considering the relationship between the lowering rate of the refractive index anisotropy Δn at 40° C. and the amount of the additive and the retardation Δn·d, the range for obtaining the transmittance of 90% or more of each of the red light R, the green light G, and the blue light B becomes $0.427<(1-0.04A) \Delta n \cdot d<0.545$ and the range for obtaining the transmittance of 95% or more of each of the red light R, the green light G, and the blue light B becomes $0.465<(1-0.04A) \Delta n \cdot d<0.479$.

As described above, according to the liquid crystal device relating to this embodiment, since the refractive index anisotropy Δn of the liquid crystals and the inter-substrate gap d are set considering tradeoff with each of the transmittance of the liquid crystal device and the right resistance, it is possible to enhance the light resistance while maintaining the transmittance of the liquid crystal device, i.e. light use efficiency.

Figure 5:
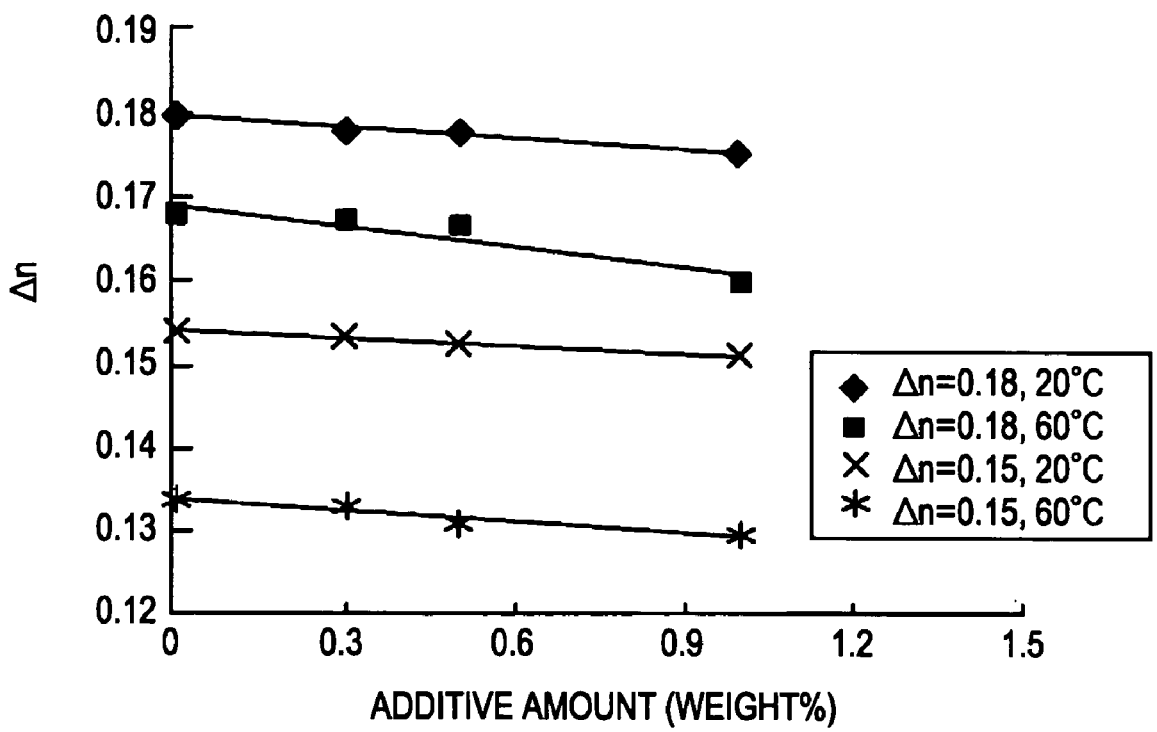
FIG. 5 is a graph illustrating the relationship between the amount of an additive and the refractive index anisotropy Δn with respect to temperatures of the liquid crystal layer and initial values of the refractive index anisotropy Δn.
Figure 6:
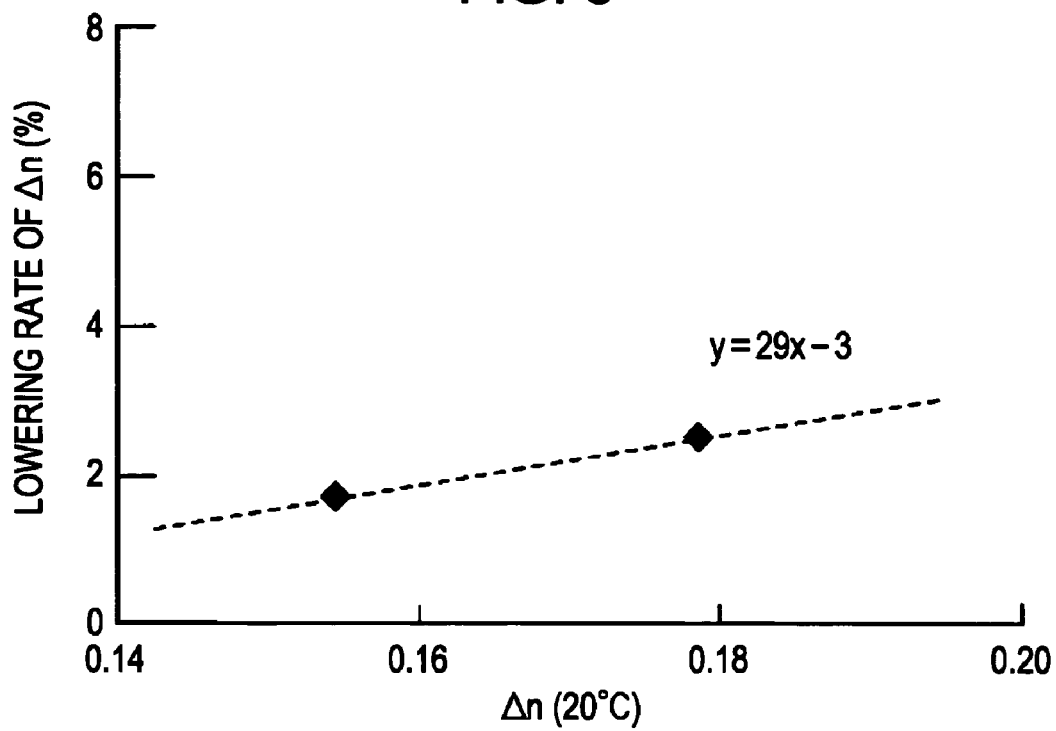
FIG. 6 is a graph illustrating the relationship between initial values of the refractive index anisotropy Δn and lowering rates of the refractive index anisotropy Δn when the additive is added to the liquid crystal layer in the case in which the temperature of the liquid crystal layer is about 20° C.

Hereinafter, a modification of the liquid crystal device of the embodiment will be described with reference to FIGS. 5 to 7. FIG. 5 is a graph showing the relationship between the amount of the additive and the refractive index anisotropy Δn for different initial values of the refractive index anisotropy Δn and different temperatures of the liquid crystal layer. FIG. 6 is a graph illustrating the relationship between the initial value of the refractive index anisotropy Δn and the lowering rate of the refractive index anisotropy Δn when the additive is added to the liquid crystals in the case in which the temperature of the liquid crystal layer is 20° C. FIG. 7 is a graph illustrating the relationship between the initial value of the refractive index anisotropy Δn and the lowering rate of the refractive index anisotropy Δn when the additive is added to the liquid crystals in the case in which the temperature of the liquid crystal layer is 60° C.

In FIG. 5, liquid crystals have 0.18 and 0.15 of the initial values (the values before the additive is added) of the refractive index anisotropy Δn, respectively. Further, the amount of the additive varies under the conditions of 20° C. and 60°, respectively. As described above, the refractive index anisotropy Δb is decreased as the amount of the additive is increased. As for both the liquid crystals of which the initial values of the refractive index anisotropy Δn are 0.18 and 0.15, the lowering rate of the refractive index anisotropy Δn is relatively high at 60° C. As a result, as the temperature of the liquid crystal layer 50 becomes higher, the lowering rate of the refractive index anisotropy Δn when the additive is added becomes larger.

If the liquid crystals of which the initial values of the refractive index anisotropies are 0.18 and 0.15 are compared under the same temperature condition, the lowering rate of the refractive index anisotropy Δn of the liquid crystal of which the initial value of the refractive index anisotropy Δn is 0.18 is larger than that of the liquid crystal of which the initial value of the refractive index anisotropy Δn is 0.15. From such results, it is found that the lowering rate of the refractive index anisotropy Δ when the additive is added to the liquid crystals becomes larger as the initial value of the refractive index anisotropy Δn becomes higher.

As shown in FIGS. 6 and 7, the relationship between the initial value and the lowering rate of the refractive index anisotropy Δn when 1 weight % of the additive is added to the liquid crystals can be expressed as a linear function. For example, provided that the initial value of the refractive index anisotropy Δn is x and the lowering rate of the refractive index anisotropy Δn is y, as shown in FIG. 6, an expression, $y=29x-3$ is approximately established in the case in which the temperature of the liquid crystal layer 50 is 20° C. In addition, as shown in FIG. 7, an expression, $y=44x-3$ is approximately established when the temperature of the liquid crystal layer 50 is 60° C. That is, the relationship between x and y, which is expressed by $y=kx-3$ (k is temperature coefficient varying according to temperature), can be established. By using this equation, the refractive index anisotropy Δn' after the additive is added can be obtained by the following equation:

$$\Delta n' = \Delta n - A \times \Delta n \times (kx-3) \div 100.$$

From the above result, the inter-substrate gap d may be set in the range of $0.427<\{\Delta n-A\times\Delta n\times(44\times\Delta n-3)\div 100\}\times d<0.545$ in order to make the transmittances of the red light R, the green light G, and the blue light B become 90% or more. More preferably, the inter-substrate gap d is set in the range of $0.465<\{\Delta n-A\times\Delta n\times(44\times\Delta n-3)\div 100\}\times d<0.479$ in order to make the transmittances of the red light R, the green light G, and the blue light B become 95% or more.

For example, in the case in which the liquid crystal device 1 is used as a light valve of a projection type display device such as a liquid crystal projector, the temperature of the liquid crystal layer 50 is raised up to about 60° C. Accordingly, in such a case, the inter-substrate gap d is set in the range of $0.427<\{\Delta n-A\times\Delta n\times(k\times\Delta n-3)\div 100\}\times d<0.545$ by using the result relating to the case of 60° C., and more preferably in the range of $0.464<\{\Delta n-A\times\Delta n\times(k\times\Delta n-3)\div 100\}\times d<0.479$.

On the other hand, in the case of a direct viewing type display which does not use high power light emitted from a light source like the projector or which uses only natural light, the inter-substrate gap d is set according to the use and the operation condition on the ground of assumption that the liquid crystal layer is at a temperature lower than 60° C., at room temperature, or at normal temperature, or at approximate temperature thereof.

As described above, according to the modification of the liquid crystal device of the embodiment, the inter-substrate gap d is set considering affection of the change of the temperature of the liquid crystal layer 50 and affection of the change of the initial value of the refractive index anisotropy Δn. Accordingly, it is more properly enhance the right resistance while maintaining the transmittance, i.e. the light use efficiency, of the liquid crystal device.

Electronic Apparatus

Next, the case in which the above-described liquid crystal device is applied to a projector which is an example of an electronic apparatus will be described with reference to FIG. 8. The above-described liquid crystal device is used as a light valve in a projector. FIG. 8 is a plan view illustrating structure of the projector. As shown in FIG. 8, a lamp unit 1102 formed of a white light source such as a halogen lamp is disposed inside the projector 1100. Light emitted from the lamp unit 1102 is split into three primary colors R, G, and B by four mirrors 1106 disposed in a light guide 1104 and two dichroic mirrors 1108 and the three primary colors R, G, and B enter liquid crystal panels 1110R, 1110B, and 1110G serving as light valves corresponding to the primary colors R, B, and G, respectively.

The structure of each of the liquid crystal panel 1110R, 111-B, and 1110G has the same structure as the above-described liquid crystal device and are driven by R, G, B three primary color signals supplied from an image signal processing circuit. Accordingly, light modulated by the liquid crystal panels is made incident onto the dichroic prism 1112 in three directions. In the dichroic prism 1112, light components R and B are reflected at 90 degrees, but light component G advances straight. Accordingly, as the result of synthesis of images of individual colors, a color image is projected on a screen via a projection lens 1114.

Here, of display images made by the liquid crystal panels 1110R, 1110B, and 1110G, the display image displayed by the liquid crystal panel 1110G must be left-right reversed with respect to the images displayed by the liquid crystal panels 1110R and 1110B.

Further, light corresponding to primary colors R, B, and G enters the liquid crystal panels 1110R, 1110B, and 1110G by the dichroic mirror 1108, a color filter is not needed.

In addition to the electronic apparatus described with reference to FIG. 8, there can be further electronic apparatuses such as a mobile type personal computer, a cellular phone, a liquid crystal television set, a viewfinder type or a monitor direct-viewing type video recorder, a car navigation device, a pager, an electronic organizer, a calculator, a word processor, a workstation, a video conferencing telephone, a POS terminal, and a device employing a touch panel. Accordingly, there is no doubt that the liquid crystal device can be applied to such a variety of kinds of electronic apparatuses.

The invention is not limited to the above-described embodiments, but be modified in a variety of manners within the scope of the invention without departing from the gist and the spirit of the invention, construed across claims and the entire specification. Variations of the liquid crystal device, the manufacturing method of the liquid crystal device, and the electronic apparatus are included in the technical scope of the invention.

The entire disclosure of Japanese Patent Applications Nos: 2006-329080, filed Dec. 6, 2006 and No. 2007-275125, filed Oct. 23, 2007 are expressly incorporated by reference hereby.

What is claimed is:

1. A liquid crystal device comprising:
   a pair of substrates; and
   a liquid crystal layer which is interposed between the pair of substrates and which contains at least one kind of additive selected from an ultraviolet ray absorbent and a radical scavenger, wherein a gap between the pair of substrates is set according to amount of the additive,
   wherein the gap d is set to satisfy an expression, $0.427 < \{\Delta n - A \times \Delta n \times (k \times \Delta n - 3) \div 100\} \times d < 0.545$, wherein $\Delta n$ is the refractive index anisotropy of the liquid crystal layer, A is the percent of additive by weight, and k is the temperature coefficient of the liquid crystal layer, which is based on the temperature of the liquid crystal layer.

2. The liquid crystal device according to claim 1, wherein the gap d is set to satisfy an expression, $0.427 < (1 - 0.04A) \times \Delta n \times d < 0.545$.

3. The liquid crystal device according to claim 2, wherein the gap d is set to satisfy an expression, $0.465 < (1 - 0.04A) \times \Delta n \times d < 0.479$.

4. The liquid crystal device according to claim 1, wherein the liquid crystal layer contains a twisted nematic (TN) liquid crystal.

5. The liquid crystal device according to claim 1, wherein the liquid crystal device displays an image by a transmissive display system.

6. The liquid crystal device according to claim 1, wherein the gap d is set to satisfy an expression, $0.465 < \{\Delta n \Delta A \times \Delta n \times (k \times \Delta n - 3) \div 100\} \times d < 0.479$.

7. A method of manufacturing a liquid crystal device including a pair of substrates and a liquid crystal layer which is interposed between the pair of substrates and which contains at least one kind of additive of additives including ultraviolet ray absorbent and radical scavenger, the method comprising:
   setting a gap between the pair of substrates according to amount of the additive; and
   bonding the pair of substrates with the gap therebetween to each other,
   wherein the gap d is set to satisfy an expression, $0.427 < \{\Delta n - A \times \Delta n \times (k \times \Delta n - 3) \div 100\} \times d < 0.545$, wherein $\Delta n$ is the refractive index anisotropy of the liquid crystal layer, A is the percent of additive by weight, and k is the temperature coefficient of the liquid crystal layer, which is based on the temperature of the liquid crystal layer.

* * * * *